US009083869B2

(12) United States Patent
Willenborg

(10) Patent No.: US 9,083,869 B2
(45) Date of Patent: Jul. 14, 2015

(54) POINT OF VIEW VIDEO MOUNTING SYSTEM

(71) Applicant: FELLOWES, INC., Itasca, IL (US)

(72) Inventor: John Willenborg, Novato, CA (US)

(73) Assignee: FELLOWES, INC., Itasca, IL (US)

(*) Notice: Subject to any disclaimer, the term of this patent is extended or adjusted under 35 U.S.C. 154(b) by 0 days.

(21) Appl. No.: 14/511,209

(22) Filed: Oct. 10, 2014

(65) Prior Publication Data

US 2015/0124163 A1 May 7, 2015

Related U.S. Application Data

(63) Continuation of application No. 13/350,785, filed on Jan. 15, 2012.

(51) Int. Cl.
H04M 1/00 (2006.01)
H04N 5/225 (2006.01)

(52) U.S. Cl.
CPC .................................. H04N 5/2252 (2013.01)

(58) Field of Classification Search
CPC ..... H04B 1/3888; H04M 1/0283; H04M 1/18
USPC ......... 455/575.6, 575.8, 556.1, 557; 396/544, 396/529, 419–420, 423, 425, 71, 25, 27, 29
See application file for complete search history.

(56) References Cited

U.S. PATENT DOCUMENTS

| 7,464,814 | B2 | 12/2008 | Carnevali | |
|---|---|---|---|---|
| 2006/0262194 | A1* | 11/2006 | Swain | 348/211.14 |
| 2007/0280677 | A1 | 12/2007 | Drake et al. | |
| 2010/0005636 | A1* | 1/2010 | Liao et al. | 24/652 |
| 2010/0061711 | A1* | 3/2010 | Woodman | 396/428 |
| 2010/0147737 | A1* | 6/2010 | Richardson et al. | 206/701 |
| 2012/0037524 | A1* | 2/2012 | Lonsdale et al. | 206/320 |

* cited by examiner

Primary Examiner — Marcos Torres
(74) Attorney, Agent, or Firm — Pillsbury Winthrop Shaw Pittman LLP

(57) ABSTRACT

A case for an electronic communications device having a lens for capturing images comprises an external casing assembly comprising: (a) an external sleeve defining an interior space, the sleeve comprising an opening at one longitudinal end; (b) a door movably mounted at the opposite end; (c) a releasable latch for securing the door in a closed position; and (d) an interchangeable lens assembly comprising a lens and a lens holder removably attached to a front side of the casing assembly. The case further comprises a sled component for receiving the electronic communication device thereon, the sled component being configured for removable receipt in an inserted position in the external sleeve by longitudinal insertion. The sled component reduces vibrations experienced by the electronic communications device. The sled component has a lens exposing area positioned for alignment with the lens of the electronics communications device to permit image capture therethrough.

21 Claims, 14 Drawing Sheets

FIGURE 1A
FIGURE 1B
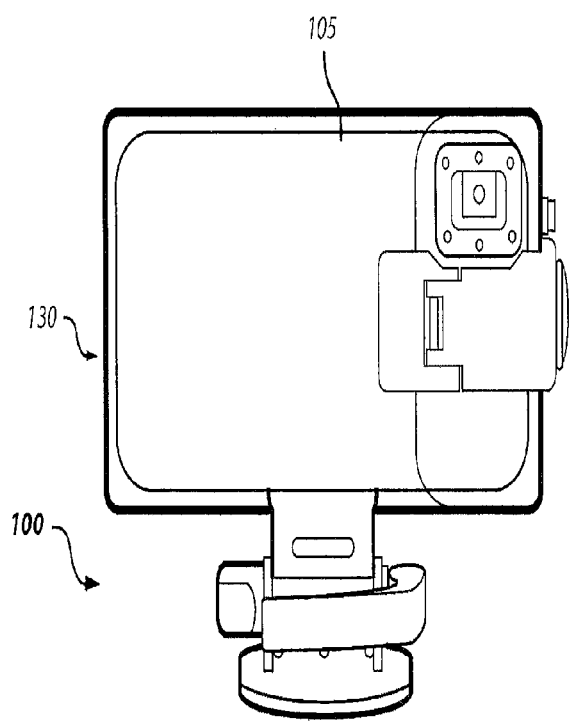
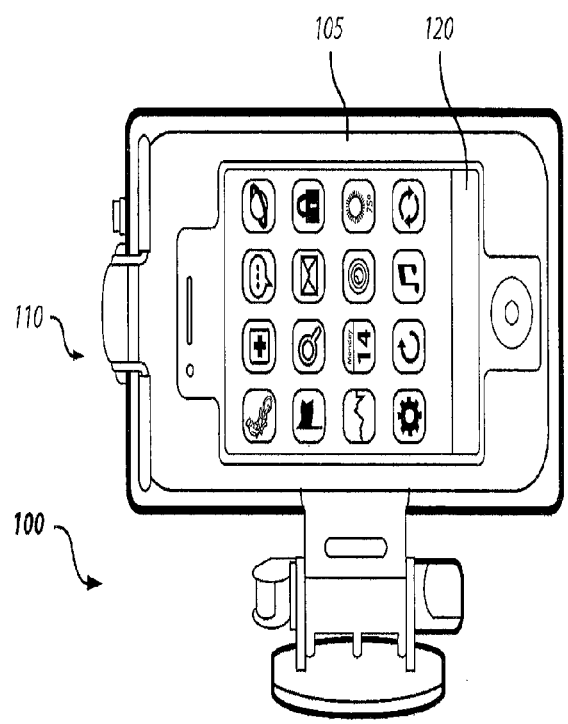

FIGURE 2A
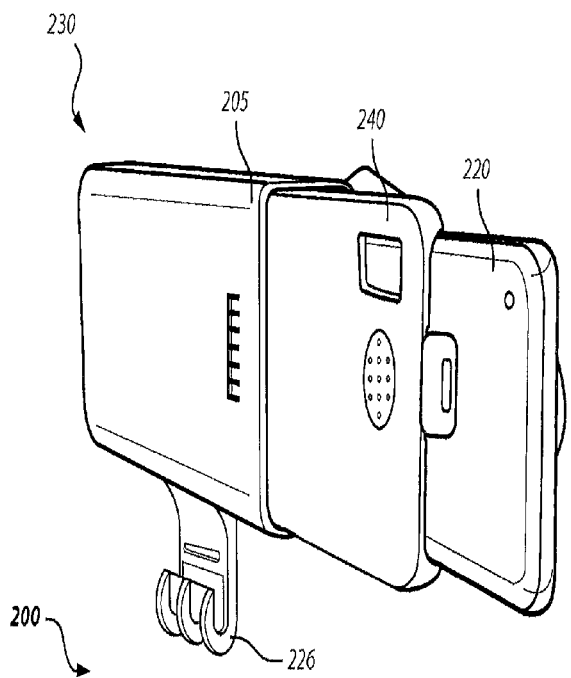
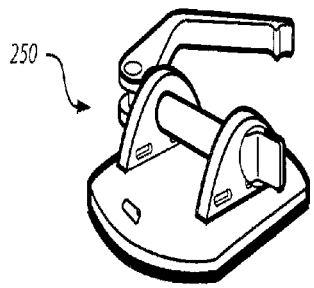
FIGURE 2B
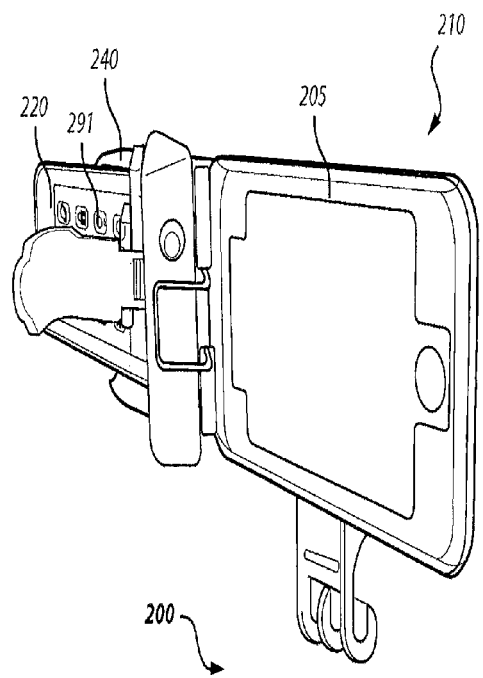
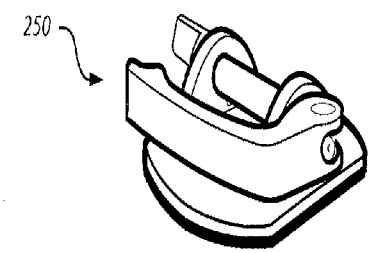

FIGURE 4A
FIGURE 4B
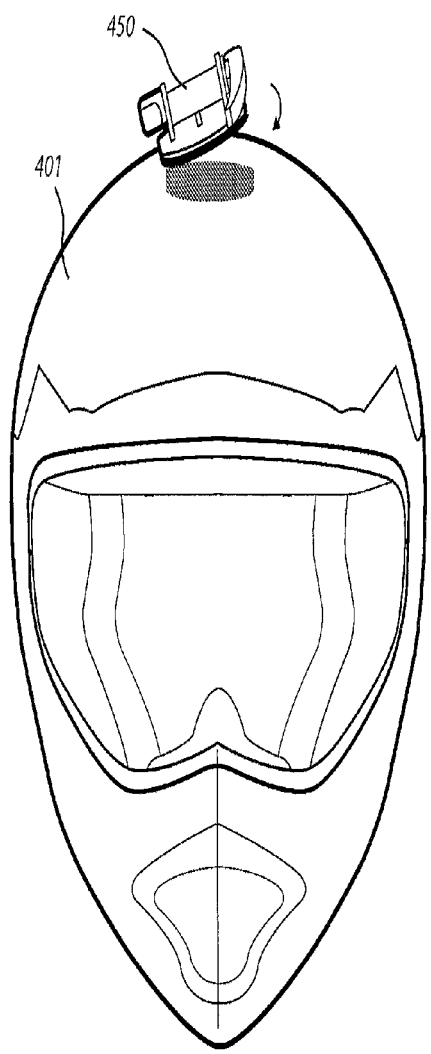
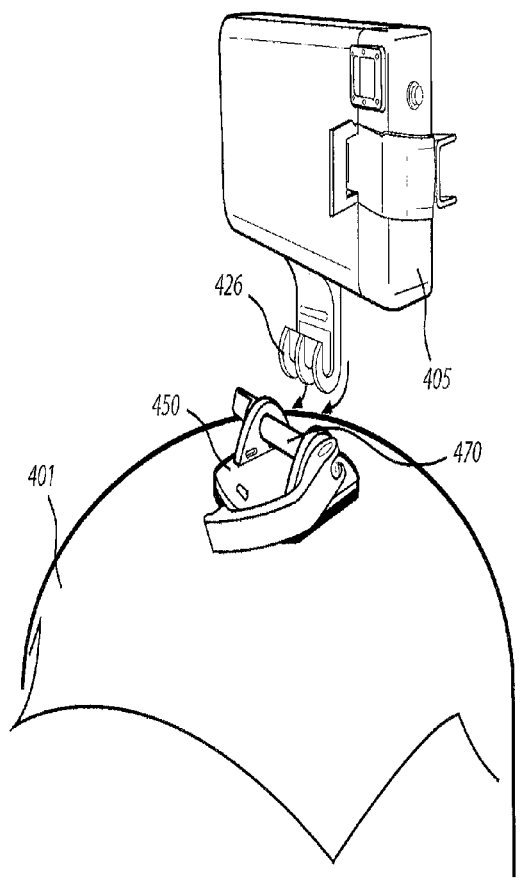

FIGURE 5A
FIGURE 5B
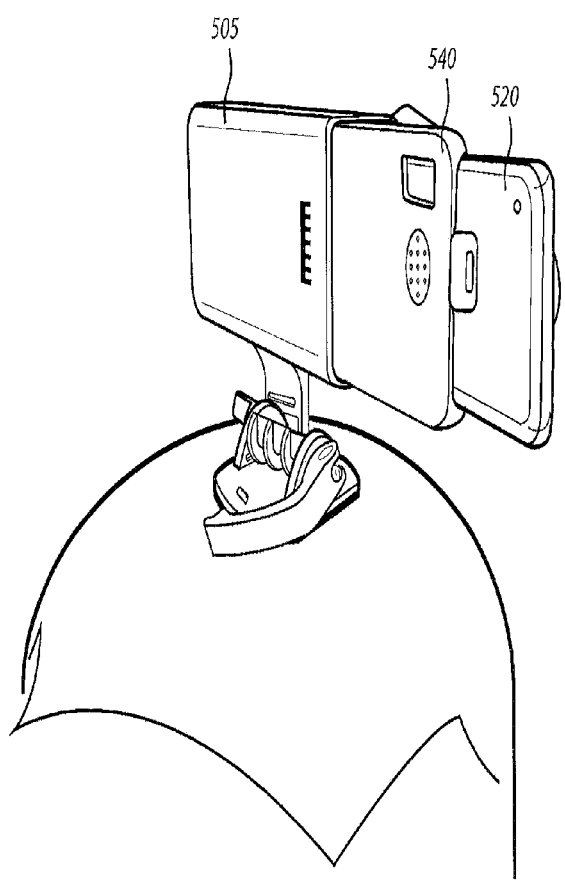
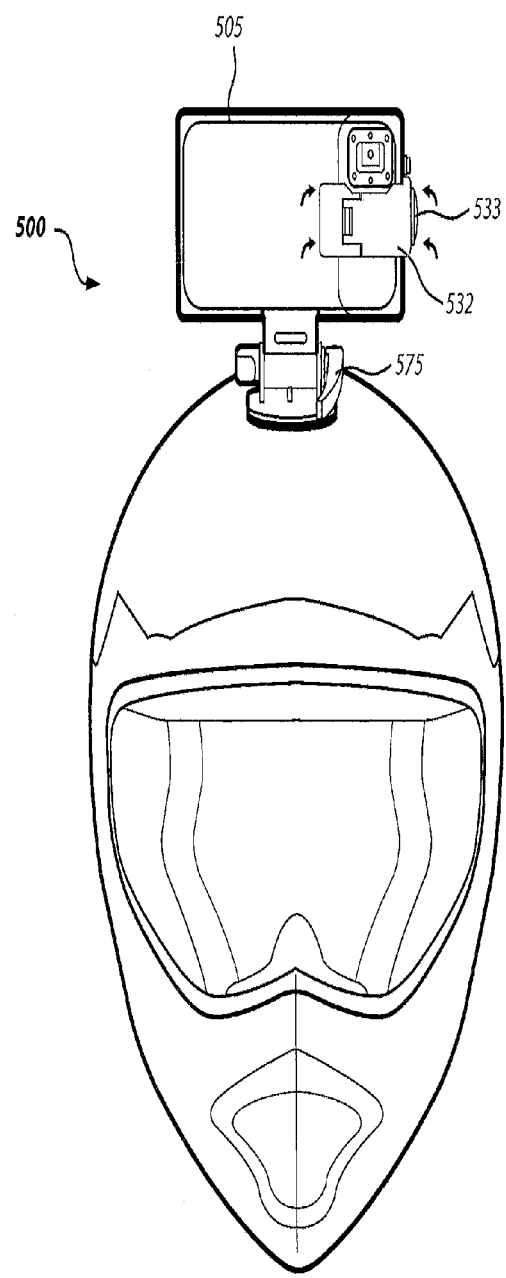

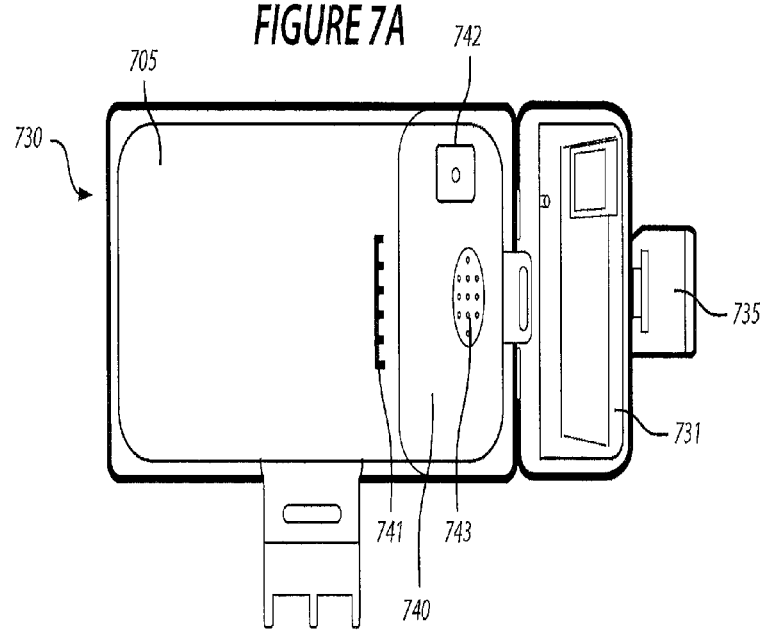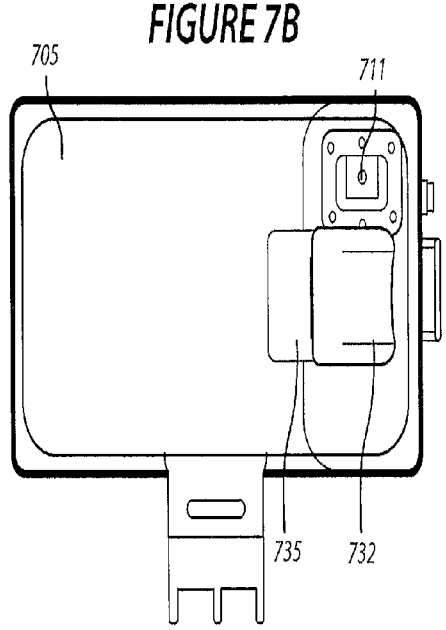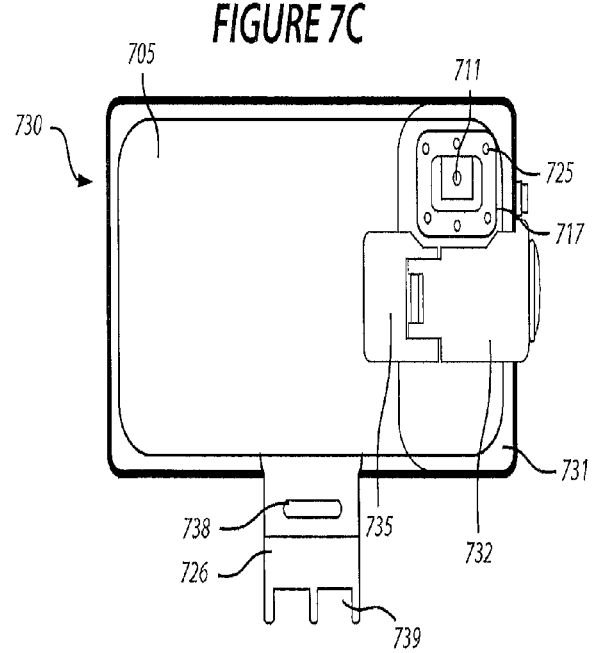

FIGURE 9A
FIGURE 9B
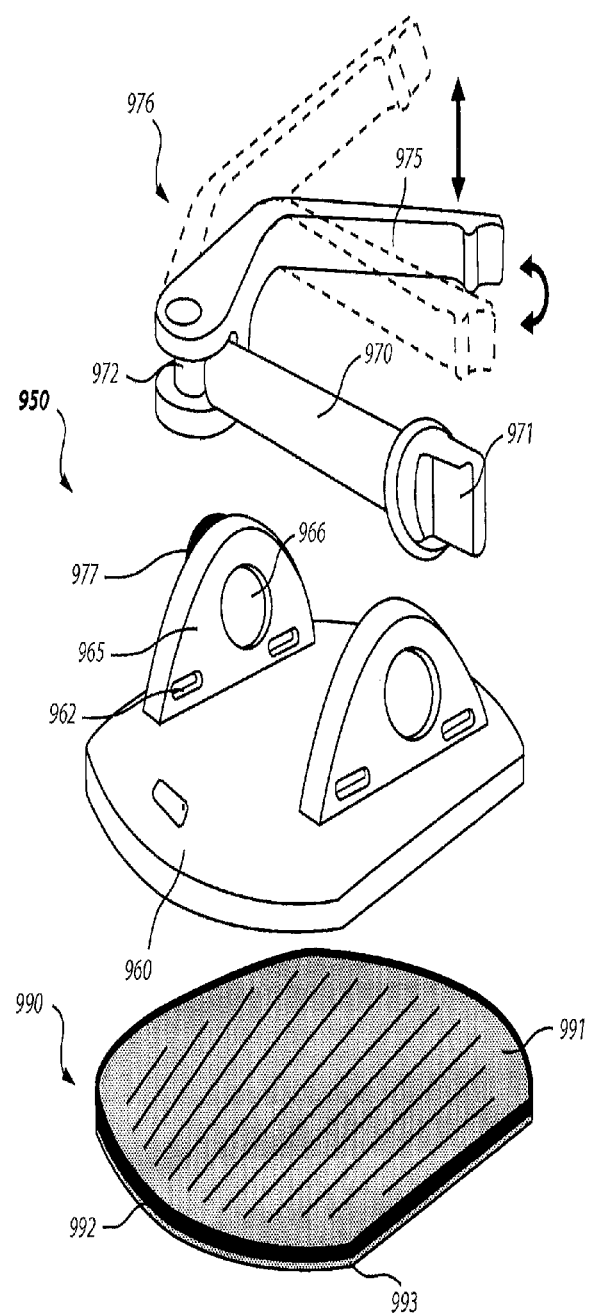
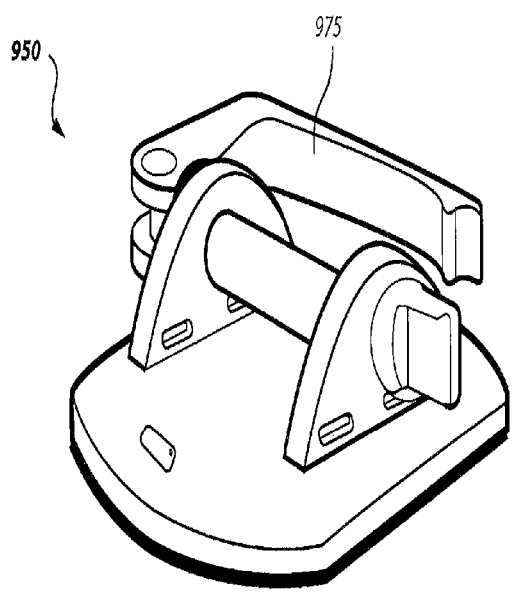

FIGURE 12A
FIGURE 12B
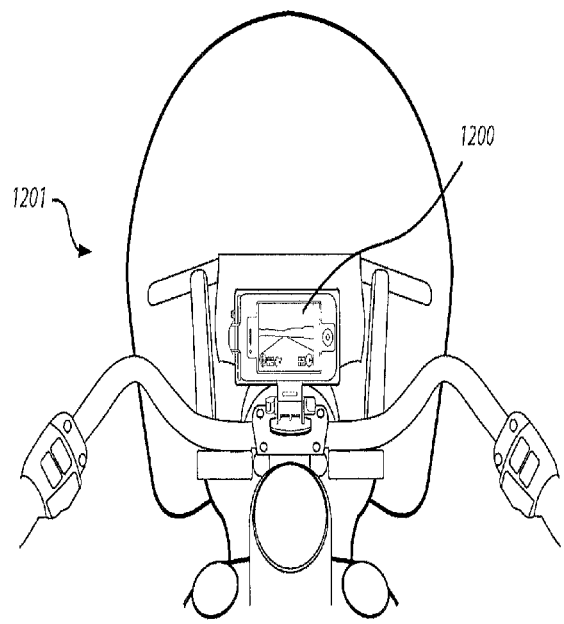
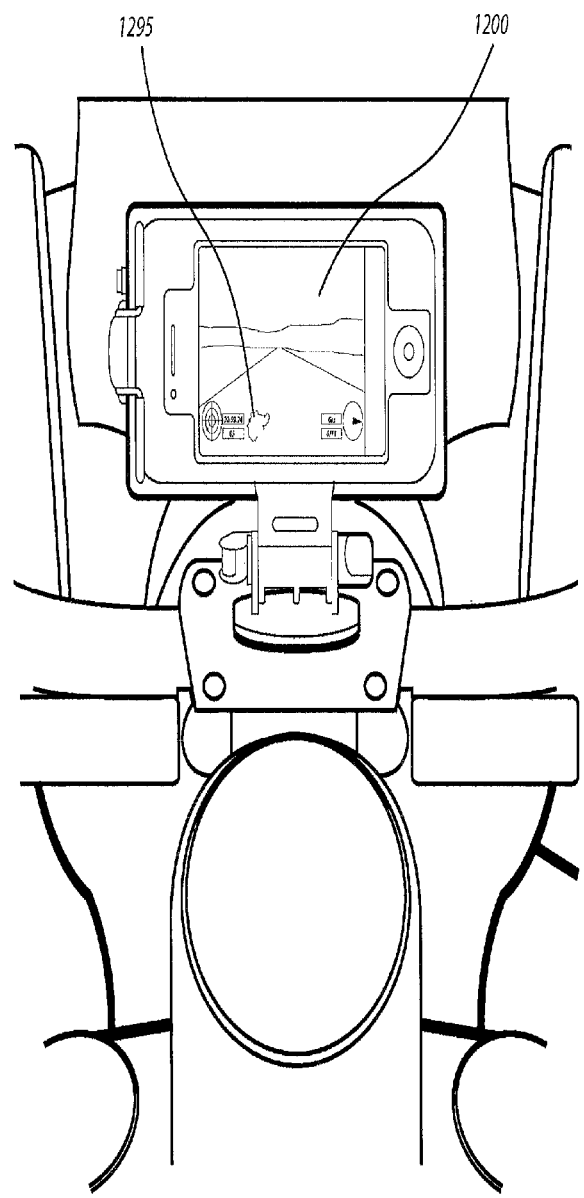

POINT OF VIEW VIDEO MOUNTING SYSTEM

The present application claims priority to U.S. patent application Ser. No. 13/350,785, filed Jan. 15, 2012, the entirety of which is incorporated herein by reference.

FIELD OF THE INVENTION

This invention relates generally to a Point of View (POV) video mounting system, and more specifically to a system and method of mounting a video and data recording and display device to record one's performance.

BACKGROUND OF INVENTION

Mountable POV video camera systems have been in existence for a few years and have been used for film and television production. Currently, POV video camera systems are used to record one's action sports performance. For example, sports accessory manufacturer Go Pro sells POV video camera systems which give sports professionals and enthusiasts the ability to record their performance in real time.

Prior art POV video camera systems, however, currently consist of camera and related hardware components with limited size and functionality. In particular, prior art POV video camera systems fail to perform sophisticated tasks that require hardware components present in many smart-phones and other high-end telecommunication consumer devices.

Prior art Point of View camera systems lack computer software applications that measure and display metrics of one's performance. For example, computer software applications can be designed to measure and display speed, acceleration, and g-forces. Prior art video camera systems also lack the capacity to accommodate various electronic devices and only support a single proprietary camera hardware component. These video camera systems also lack the ability to provide feedback to a user in real time.

Moreover, prior art video camera systems exhibit poor locking capabilities. For example, these video camera systems often move due to vibration when sports equipment operate at high speeds. To prevent the camera from moving, users are required to purchase specialized tools to fasten the device to a desired surface. To this end, there is a need for a POV video mounting system which addresses the aforementioned limitations of prior art POV camera systems. The present invention addresses such a need.

SUMMARY OF THE INVENTION

A system, method, and apparatus are disclosed. In particular, a Point of View (POV) video mounting system described herein includes a casing assembly operable to fit an electronic device therein. The electronic device has video and data recording and display capability. In addition, a POV video mounting system includes a mounting assembly coupled to the casing assembly and operable to mount the POV video mounting system to sports equipment.

BRIEF DESCRIPTION OF THE DRAWINGS

FIG. 1A illustrates a perspective front view of an assembled POV video mounting system in accordance with a system and method of the present invention.

FIG. 1B illustrates a perspective back view of an assembled POV video mounting system in accordance with a system and method of the present invention.

FIG. 2A illustrates an exploded front view of a disassembled POV video mounting system in accordance with a system and method of the present invention.

FIG. 2B illustrates an exploded back view of a disassembled POV video mounting system in accordance with a system and method of the present invention.

FIG. 4A provides a graphic illustration of a method of affixing a mounting assembly to sports equipment in accordance with a system and method of the present invention.

FIG. 4B provides a graphic illustration of a method of coupling a casing assembly to a mounting assembly in accordance with a system and method of the present invention.

FIG. 5A provides a graphic illustration of a method of inserting an electronic device having video and data recording and display capabilities inside a casing sleeve in accordance with a system and method of the present invention.

FIG. 5B provides a graphic illustration of a method of latching a door component of the casing sleeve to secure the electronic device within the sleeve in accordance with a system and method of the present invention.

FIG. 7A illustrates a perspective front view of an unlatched casing sleeve in accordance with a system and method of the present invention.

FIG. 7B illustrates a snapshot of a casing sleeve moving from an unlatched state to a latched state in accordance with a system and method of the present invention.

FIG. 7C illustrates a perspective front view of a latched casing sleeve in accordance with a system and method of the present invention.

FIG. 9A illustrates an exploded view of a mounting assembly in accordance with a system and method of the present invention.

FIG. 9B illustrates a perspective view of a mounting assembly in a locked state in accordance with a system and method of the present invention.

FIG. 12A illustrates a perspective view of a POV video mounting system mounted to a motorcycle in accordance with a system and method of the present invention.

FIG. 12B illustrates a close up view of a POV video mounting system mounted to a motorcycle in accordance with a system and method of the present invention.

DETAILED DESCRIPTION

Figure 3:
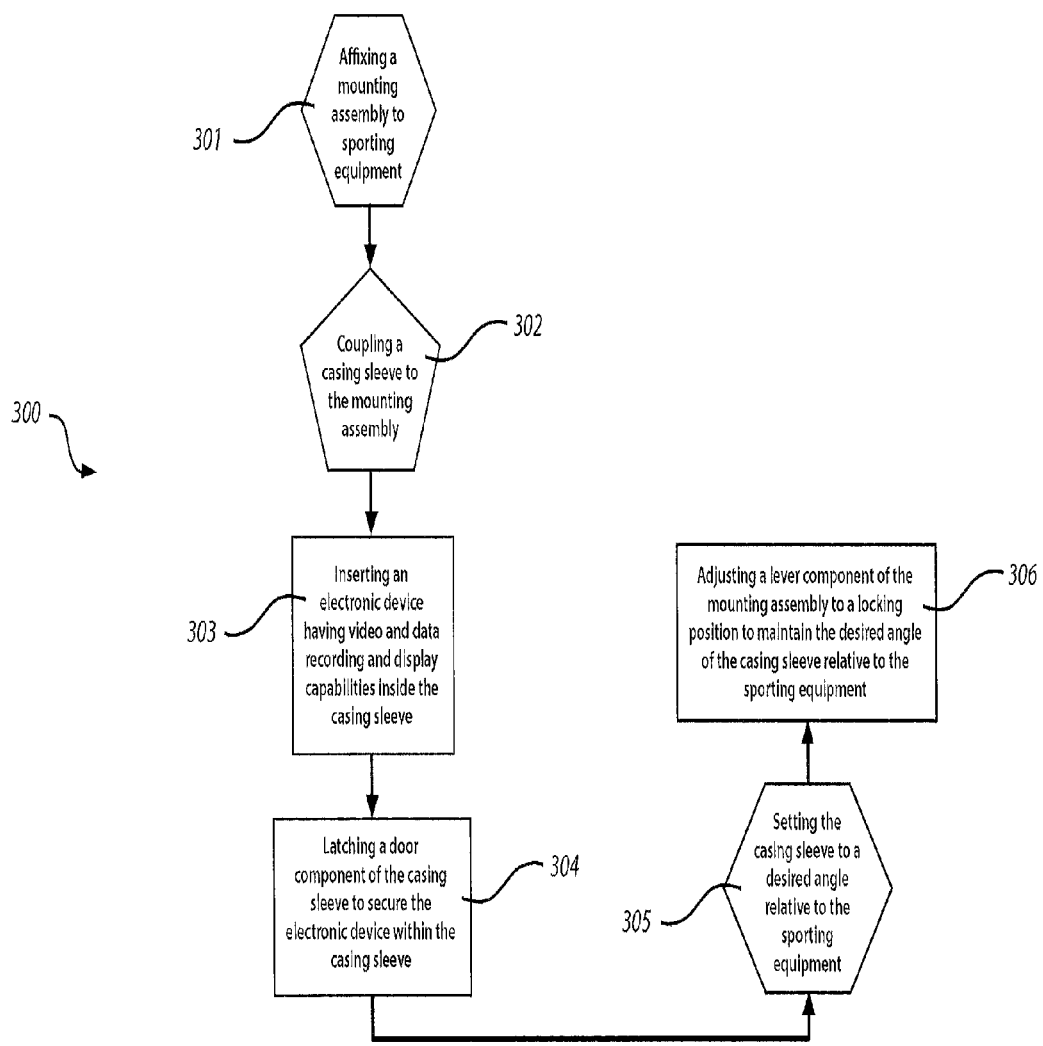
FIG. 3 illustrates a flow chart of a method for assembling a POV video mounting system in accordance with a system and method of the present invention.

This invention relates generally to Point of View (POV) video mounting systems, and more specifically to a system and method of mounting a video and data recording and display device to record one's performance. The following description is presented to enable one having ordinary skill in the art to make and use the embodiment described herein and is provided in the context of a patent application. The generic principles and features described herein will be apparent to those skilled in the art. Thus, the present embodiment is not intended to be limited to the embodiments shown, but is to be accorded the widest scope consistent with the principles and features described herein.

A system, method, and apparatus are disclosed. In particular, Point of View (POV) video mounting systems described herein include a casing assembly operable to fit an electronic device therein. The electronic device has video and data recording and display capability. In addition, a POV video mounting system includes a mounting assembly coupled to the casing assembly and operable to mount the POV video mounting system to sports equipment.

FIG. 1A is an illustration of a perspective front view of an assembled Point of View video mounting system 100 in accordance with a system and method of the present invention. POV video mounting system 100 is configured to be mounted to sports equipment such as bicycles, motorbikes, jet skis, race cars, etc. However, there is great versatility to where and how POV video mounting systems 100 are mounted. For example, POV video mounting system 100 can be mounted to weapons and armored fighting vehicles. As will be described below, POV video mounting system 100 can be coupled to other mounting surfaces such as a user's person.

It should be understood by those having ordinary skill in the art that with regards to orientation, FIG. 1A illustrates the front view 130 of POV video mounting system 100 which is the back side of casing assembly 105, according to an embodiment of the present invention. As such, the front view 130 of POV video mounting system 100 faces away from the user during operation whereas the front side of casing assembly 105 faces the user (e.g. driver of sports equipment to which system 100 is attached) when the system 100 is in operation. For example, if POV video mounting system 100 is mounted to a front fender of a bicycle, the front side of casing sleeve 105 faces the rider and in the direction of the rider's view.

FIG. 1B illustrates a perspective back view 110 of an assembled Point Of View (POV) video mounting system 100 in accordance with a system and method of the present invention. It should be understood by one having ordinary skill in the art that with regards to orientation, FIG. 1B illustrates the back view 110 of POV video mounting system 100 which exposes the front side of casing assembly 105. As shown, an enclosed electronic device 120 with video and data recording and display functionality is displayed through a transparent portion of the casing assembly 105. Accordingly, the enclosed electronic device 120 is visible from the back side of the casing assembly 105 according to an embodiment of the present invention.

In an embodiment, a back side of casing assembly 105 faces away from the user when the system 100 is in operation. For example, if POV video mounting system 100 is mounted to a front fender of a motorcycle, the back side of casing assembly 105 faces the driver.

FIG. 2A illustrates an exploded front view of a disassembled Point of View (POV) video mounting system 200 in accordance with a system and method of the present invention. As shown, POV video mounting system 200 includes a casing assembly 205, an electronic device 220 partially inside of the assembly 205, and a mounting assembly 250 disposed underneath the casing assembly 205. It should be understood that FIG. 2A illustrates the front view 230 of POV video mounting system 200 which is the back side of casing assembly 205.

As shown in the figure, a sled component 240 with electronic device 220 slidably coupled therein can easily be inserted into or removed from the casing assembly 205. Sled component 240 is an optional component of POV video mounting system 200.

Sled component 240 may be coupled to electronic device 220 and then inserted into casing assembly 205. In an embodiment, sled component 240 reduces the amount of vibration experienced by electronic device 220 when POV video mounting system 200 is in operation. To reduce the amount of vibration experienced by electronic device 220, sled component 240 comprises soft plastic or hard rubber. Sled component 240 may also be used to provide additional physical protection for the electronic device 220.

Electronic device 220 includes video and data recording and display capabilities. In an embodiment, electronic device 220 is a music playing device. For example, electronic device 220 may be an iPhone® or an iPod Touch® sold and distributed by Apple Computers, Inc., headquartered in Cupertino, Calif. It should be understood, however, that the present invention is not limited to any particular device. As such, any device which includes video and/or data recording and display capabilities and can be assembled within casing assembly 200 is in the spirit and scope of the present invention.

Furthermore, electronic device 220 is operable to display live images, recorded video footage, performance metrics, and other useful information on its display. Electronic device 220 is also capable to record videos at 720p-1080p video.

FIG. 2A further illustrates that casing assembly 205 includes a coupling component 226 through which a mounting assembly 250 is coupled thereto. In the embodiment shown in FIG. 2A, coupling component 226 is shaped in a j-hook configuration which couples to an axle component of the mounting assembly.

Moving forward, FIG. 2B provides an illustration of an exploded back view of a disassembled POV video mounting system 200 in accordance with a system and method of the present invention. Alternatively, with respect to FIG. 2A, FIG. 2B illustrates the front side of casing assembly 205.

Accordingly, FIG. 2A and FIG. 2B illustrate different perspective views of POV video mounting system 200. It should be understood that assembling the components shown in FIGS. 2A and 2B results in a configured POV video mounting system 200, as shown in FIGS. 1A and 1B.

It should be understood that a POV video mounting system in accordance with the present invention is not limited to the components or configuration of the components displayed in FIGS. 2A and 2B. As such, a POV video mounting system consistent with the present invention may include all or more components than those displayed in FIGS. 2A and 2B and this would be in the spirit and scope of the present invention.

For example, FIGS. 2A and 2B illustrate a casing sleeve 205. However, it should be understood by those having ordinary skill in the art that any assembly which protects, secures, and provides a hermetic covering to the electronic device therein is consistent with the present invention.

Figure 6A:
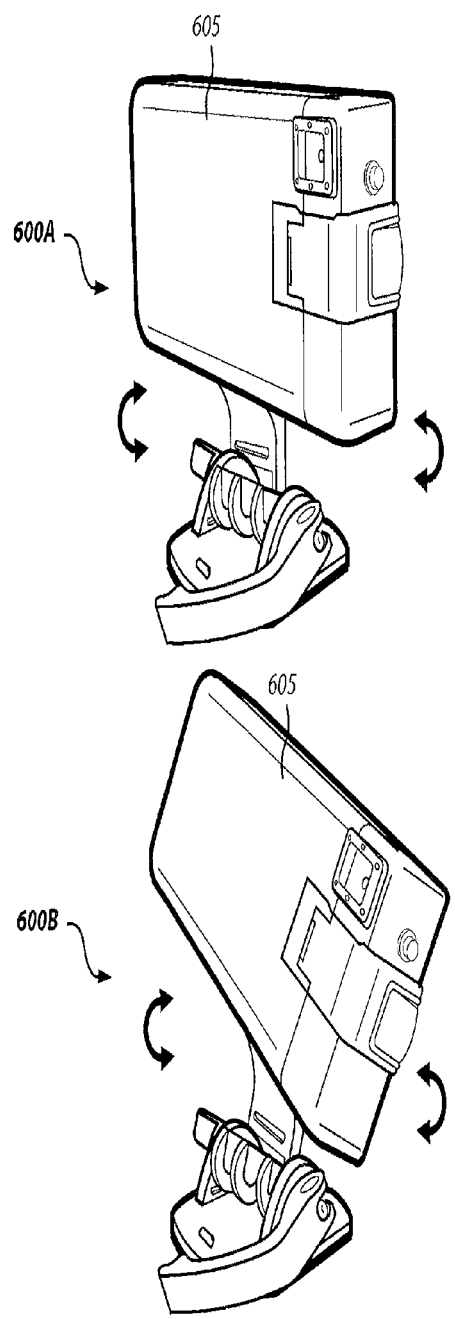
FIG. 6A provides a graphic illustration of a method of setting the casing sleeve to a desired angle relative to the mounting assembly in accordance with a system and method of the present invention.
Figure 6B:
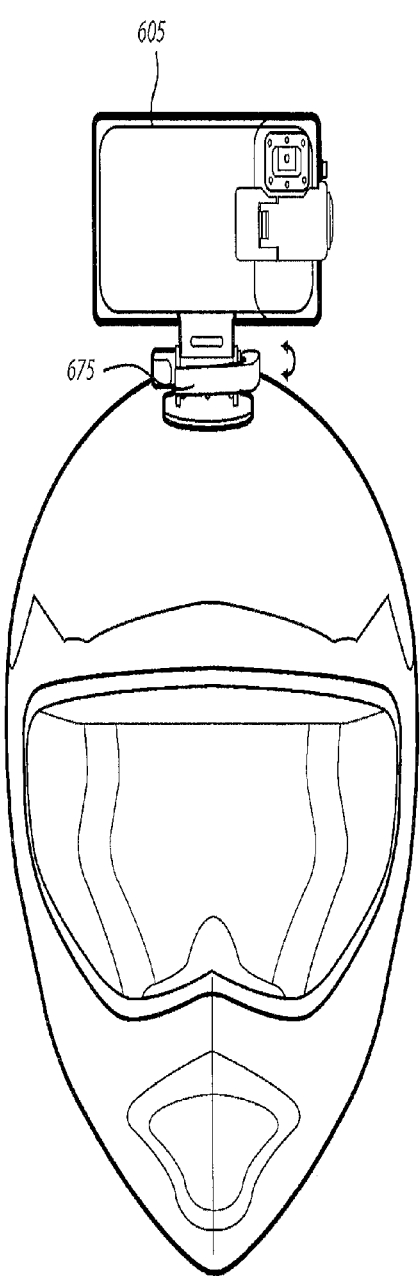
FIG. 6B provides a graphic illustration of a method of adjusting a lever component of the mounting assembly to a locked position to maintain the desired angle of the casing sleeve relative to the mounting assembly in accordance with a system and method of the present invention.

FIG. 3 illustrates a flow chart 300 of a method for assembling a POV video mounting system in accordance with a system and method of the present invention. As shown, flowchart 300 includes blocks 301-306. It should be understood by one having ordinary skill in the art that the present invention is not limited to the blocks shown in FIG. 3. As such, the present invention may further include additional blocks or less blocks than shown in the figure which is in the spirit and scope of the present invention. As will be described below, blocks 301 and 302 are illustrated in FIGS. 4A and 4B, respectively; blocks 303 and 304 are illustrated in FIGS. 5A and 5B, respectively; and blocks 305 and 306 are illustrated in FIGS. 6A and 6B, respectively.

FIG. 4A provides a graphic illustration of block 301 which provides a method of affixing a mounting assembly to sports equipment in accordance with a system and method of the present invention. As shown, mounting assembly 450 is to be mounted to a top surface of helmet 401.

FIG. 4B provides a graphic illustration of block 302 which provides a method of coupling a casing assembly 405 to the mounting assembly 450 in accordance with a system and method of the present invention. As shown, the coupling component 426 of casing assembly 405 is coupled to mounting assembly 450 via axle 470. In an embodiment, when casing assembly 405 is coupled to mounting assembly 450, axle 470 and coupling component 426 form a tight connection.

FIG. 5A provides a graphic illustration of block 303 which provides a method of inserting an electronic device 520 having video and data recording and display capabilities inside a casing sleeve 505 in accordance with a system and method of the present invention. As shown, electronic device 520 with sled component 540 coupled thereto is inserted into the casing sleeve 505. In addition, one can set the angle of casing assembly 505 prior to inserting electronic device 520 and sled component 540 therein.

FIG. 5B provides a graphic illustration of block 304 which provides a method of latching a door component of the casing sleeve 505 to secure the electronic device 520 within the sleeve 503, according to a system and method of the present invention. In particular, latching arm 532 and latching bracket 533 are in a latch state and lever component 575 is in an unlocked state such that a user can adjust the angle of the casing sleeve 505 relative to the mounting assembly or attached surface (e.g. helmet).

FIG. 6A provides a graphic illustration of block 305 which provides a method of setting the casing sleeve 605 to a desired angle relative to a mounting assembly in accordance with a system and method of the present invention. As shown, casing sleeve 605 is set to a first angle shown by state 600A whereas state 600B illustrates a casing sleeve 605 set to a second angle.

FIG. 6B provides a graphic illustration of block 306 which provides a method of adjusting a lever component 675 of the mounting assembly to a locked position to maintain the desired angle of the casing sleeve 605 relative to the mounting assembly, according to a system and method of the present invention. Once lever component 675 is placed in a locking position, casing sleeve 605 is fixed at a certain angle. Once a user locks the mounting assembly via lever component 675, a user can begin recording their performance.

Continuing on through the figures, FIG. 7A is a perspective front view of an unlatched casing sleeve 705 in accordance with a system and method of the present invention. In particular, FIG. 7A shows an unlatched door 731 exposing a sled component 740 within casing sleeve 705. When door 731 is unlatched, both electronic device (not shown in this figure) and sled component 740 can readily be removed from or inserted into the casing sleeve 705.

FIG. 7A also provides an illustration of a latching clip component 735 disposed on the door 731. In an embodiment, latching clip component 735 works in cooperation with casing lip component 741 to latch door 731 in place as further described below.

Furthermore, a finger groove 743 disposed on the sled component 740 shown can aid one remove or insert the electronic device and sled component 740 inside of the casing sleeve 705. Moreover, sled component 740 has a small cut out 742 which exposes a lens component of the electronic device.

Moving forward through the figures, FIG. 7B illustrates a snapshot of a casing sleeve 705 moving from an unlatched to a latched state in accordance with a system and method of the present invention. As shown, latching clip component 735 is coupled to lip component 741 (see FIG. 7A). In addition, the figure shows that latching arm 732 is erect and extends perpendicularly to the surface of the casing assembly 705. Most notably, a lens component 711 is exposed through the sled component and door.

Moving forward, FIG. 7C is a perspective front view 730 of a latched casing sleeve 705 in accordance with a system and method of the present invention. As shown, when casing sleeve 705 is latched, both latching arm 732 and latching clip component 735 are disposed laterally across the body of the door 731. In an embodiment, door 731 is operable to allow an electronic device and sled component slide in and out of the casing sleeve 705. Door 731 is further operable to secure an electronic device from sliding out of casing sleeve 705.

In addition, door 731 further includes a front lens area 717 which is secured to casing sleeve 705 via screws 725. Front lens area 717 can be removed from the back of casing sleeve 705 such that a wide area lens can be fitted therein over a lens 711 of the electronic device to record and display a wide area lens by the device during operation.

In an embodiment, POV video mounting system of the present invention includes components and features for affixing the system to another body (e.g. such as the surface of sports equipment). For example, in the embodiment shown in FIG. 7C, coupling component 726 includes openings 738, 739 through which a lanyard, rope or other like device can be disposed there through to secure a POV video mounting system of the present invention to another body.

Figure 8A:
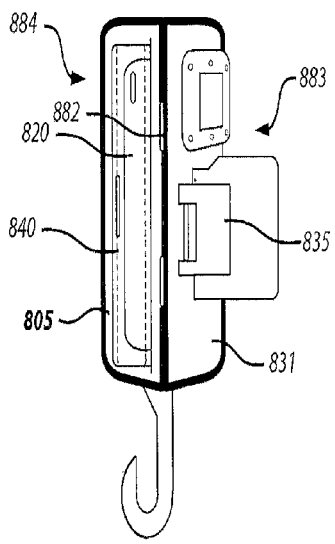
FIG. 8A illustrates a perspective side view of an unlatched casing sleeve in accordance with a system and method of the present invention.

Moving forward, FIG. 8A illustrates a perspective side view of an unlatched casing sleeve 805 in accordance with a system and method of the present invention. As shown, door 831 is open exposing electronic device 820, sled component 840, and the inside of latching clip 835. In an embodiment, when casing sleeve 805 moves from a latched state to an unlatched state, a latching component (not shown), latching clip 835, and door 831 rotates from the back side 884 towards the front side 883 of casing sleeve 805 via hinges 882, as described above.

Figure 8C:
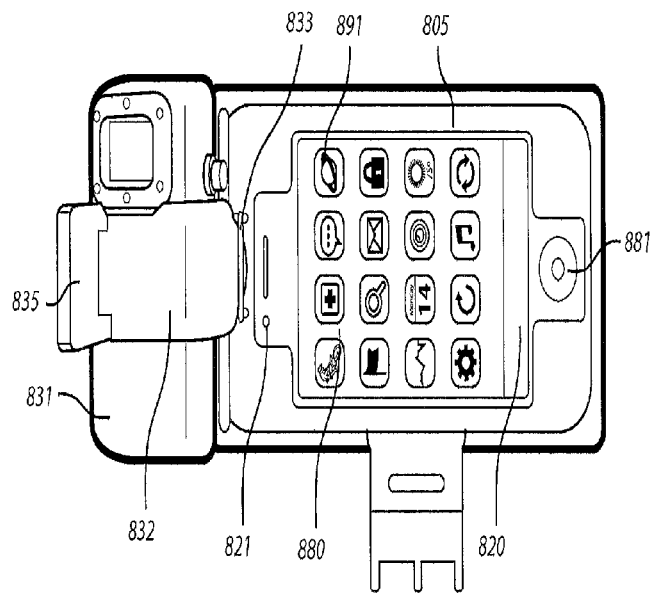
FIG. 8C illustrates a perspective back view of an unlatched casing sleeve in accordance with a system and method of the present invention.
Figure 8B:
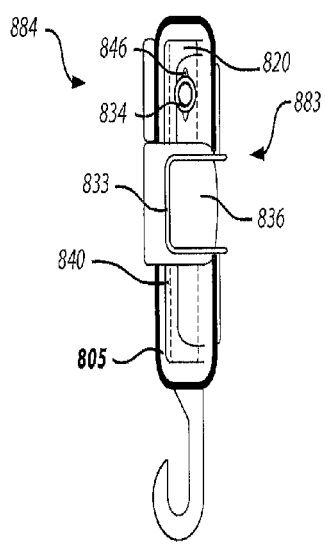
FIG. 8B illustrates a perspective side view of a latched casing sleeve in accordance with a system and method of the present invention.

Alternatively, FIG. 8B illustrates a perspective side view of a latched casing sleeve 805 in accordance with a system and method of the present invention. As shown, when casing sleeve 805 is latched, both the electronic device 820 and sled component 840 are secured therein. In an embodiment, when casing sleeve 805 is latched, latching bracket 833 fits firmly around an elevated portion 836 of the latching arm. In the embodiment, latching bracket 833 fits flush around the elevated portion 836 such that the aforementioned components aid in the locking mechanism functionality of the door. In operation, latching bracket 833 rotates laterally from the front side of the casing sleeve 805 towards the back side 884 of the sleeve 805 to a latched state, as illustrated in the figure.

In addition, FIG. 8B illustrates a button 834 disposed on the surface of the door. In operation, button 834 is operable to engage a button 846 on the electronic device 820. In an embodiment, button 834 engages a sleep/wake function on the electronic device 820.

Moving forward, FIG. 8C illustrates a perspective back view of an unlatched casing sleeve 805 in accordance with a system and method of the present invention. As shown, the front side of casing sleeve 805 illustrates a touch screen membrane 880 through which a user can access buttons and functionality (via icons 891) on the electronic device 820. For example, touch screen membrane 880 can allow a user to access power button 881 on the electronic device 820 to turn the device 820 on and off.

The figure also illustrates how latching arm 832 and latching clip component 835 are disposed upon the door 831. As shown, latching arm 832, along with latching clip 835 span across the entire width of door such that the aforementioned components can latch the door and secure electronic device 820 (sled component 840 is optional) therein. Additionally, the figure shows a top view of locking component 833.

FIG. 8C further illustrates an additional back lens 821 on the electronic device 820. In an embodiment, a user can toggle via a computer software application(s) installed on the electronic device 820 between a front lens (see FIG. 7B, ref #711) and a back lens 821 while the POV video mounting system is in operation. For example, if a POV video mounting system in accordance with the present invention is in operation (e.g. mounted to sports equipment) and a user sets the lens preference to the front lens, the electronic device 820 can record and display video footage in the direction traveled by the sports equipment.

Alternatively, if a user sets the lens preference to back lens 821, the electronic device 820 can record and display video footage in the direction of the user. In an embodiment, when the user sets the lens preference to the back lens 821, the electronic device 820 records and displays the user. For example, while a user-driver traverses along a course, the user-driver activates back lens 821 to record him or her during the course. A user-driver may use the video footage to view the user-driver's facial expressions along specific areas of the traversed course.

Figure 8D:
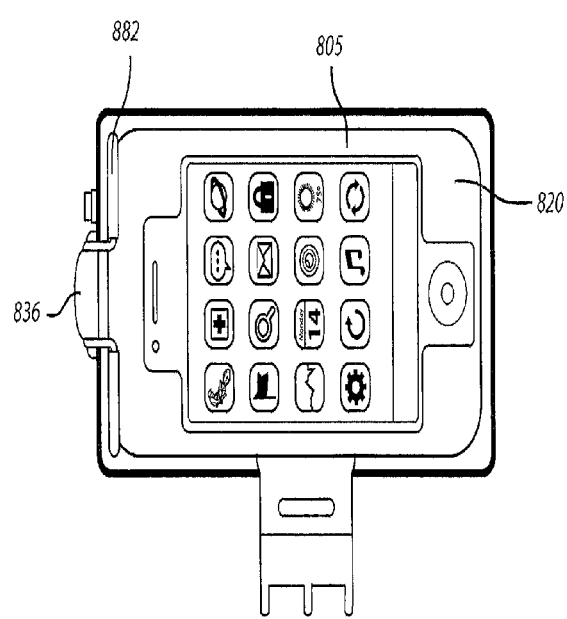
FIG. 8D illustrates a perspective back view of a latched casing sleeve in accordance with a system and method of the present invention.

Moving forward, FIG. 8D illustrates a perspective back view of a latched casing sleeve 805 in accordance with a system and method of the present invention. As shown, when casing sleeve 805 is latched, the electronic device 820 and sled component (not shown) is enclosed and secured within the casing sleeve 805. Notably, when casing sleeve 805 is latched, latching bracket 833 (extending from hinges 882) is shown fitted flush around the elevated portion 836 of the latching arm.

FIG. 9A illustrates an exploded view of a mounting assembly 950 in accordance with a system and method of the present invention. As shown, mounting assembly 950 includes a mounting base 960 and a quick release assembly 976. As described above, mounting assembly 950 provides a mechanism to mount a POV video mounting system of the present invention to the surface of a body such as sports equipment.

In particular, mounting base 960 includes a pair of arches 965 through which an axle 970 of quick release assembly 976 extends there through. Axle 970 is maintained within a pair of arches 965 via openings 960 and quick release lever 975. Quick release assembly 976 includes a quick release lever 975 coupled to axle 970 by a nut 972. A user can engage the quick release lever 975 to loosen the quick release assembly 976 and set a casing sleeve to a desired angle. Once the casing sleeve is set to the desired angle, the user can lock the casing sleeve's position in place by engaging the quick release lever 975 by pushing the lever 975 towards the axle 970 such that the tip of the lever 975 extends in the same direction of the axle 970.

Furthermore, the quick release lever 975 can move in multiple directions as illustrated in FIG. 9A. For example, quick release lever 975 can move up, down, left and right. In relation to axle 970, quick release lever 975 can move in a direction perpendicular to axle 970 (e.g. moving towards or away from the axle 970). In addition, quick release lever 975 can move in an orbit fashion around axle 970.

In an embodiment, one can loosen or tighten the quick release assembly 976 by rotating the quick release lever 975. For example, the quick release assembly 976 can be tightened by rotating the quick release lever 975 in a clockwise direction whereas loosening the assembly 976 requires rotating the lever 975 in a counter clockwise direction according to an embodiment of the present invention.

When quick release lever 975 is in the unlocked position, a casing sleeve coupled to the mounting assembly 950 can be removed from the assembly 950, as described above. In the embodiment illustrated in FIG. 9A, mounting assembly 950 further includes a washer 977 disposed flush against an arch 965 and quick release lever 975. FIG. 9A further illustrates openings 962 through which a lanyard, rope or other like device may be disposed there through to secure a POV video mounting system of the present invention to another body.

The size of the openings 962 may be on the order of centimeters. However, the size of the openings can also be on the order of inches. The present invention is not limited to openings 962 of a certain size so long as the openings are large enough to let a lanyard or other similar device be threaded there through. In the embodiment shown in FIG. 9A, two pairs of openings 962 are present on the arches of the mounting assembly. One having ordinary skill in the art understands that the present invention is not limited to two pairs of openings. The present invention is amenable to include any number of openings 962 so long as an additional mechanism is used to secure the POV video mounting system to a body.

Finally, FIG. 9A illustrates a foam tape pad 990 beneath mounting base 960. In an embodiment, foam tape pad 990 includes an adhesive layer disposed on the top 991 and bottom 993 of the base 992 portion of the foam tap pad 990. In operation, the adhesive layer adheres to a surface desired by a user.

Foam tape pad 990 may be of any type such that it enables the Point Of View video mounting system to mount securely upon a surface. Foam tape pad 990 may be chosen according to performance metrics such as dynamic shear. In an embodiment, foam tape pad 990 may have a dynamic shear value in the range of 40-140 pounds per square inch (psi). For example, 3M Corporation® sells foam pads of varying performance characteristics such as the 3M Double Coated Removable Foam Tape 4451, a double coated foam tape pad made of polyethylene which features a dynamic shear value of 140 psi. As such, 3M Corporation's Foam Tape 4451 is suitable for use within the POV video mounting system described herein. Moreover, vinyl and urethane foam pads may be suitable substitutes so long as the dynamic shears of the pads exceed 40 psi.

Moving forward, FIG. 9B illustrates a perspective view of a mounting assembly 950 in a locked position in accordance with a system and method of the present invention. As described above, quick release lever 975 can be adjusted to a locked position to maintain the position (e.g. tilt angle) of the casing sleeve set by a user. In an embodiment of the present invention, when quick release lever 975 is in a locked position, a casing sleeve cannot easily be disassembled from the mounting assembly 950. As such, when the quick release lever 975 is in a locked position, a casing sleeve and mounting assembly 950 operate collectively as a single POV video mounting system.

Figure 10:
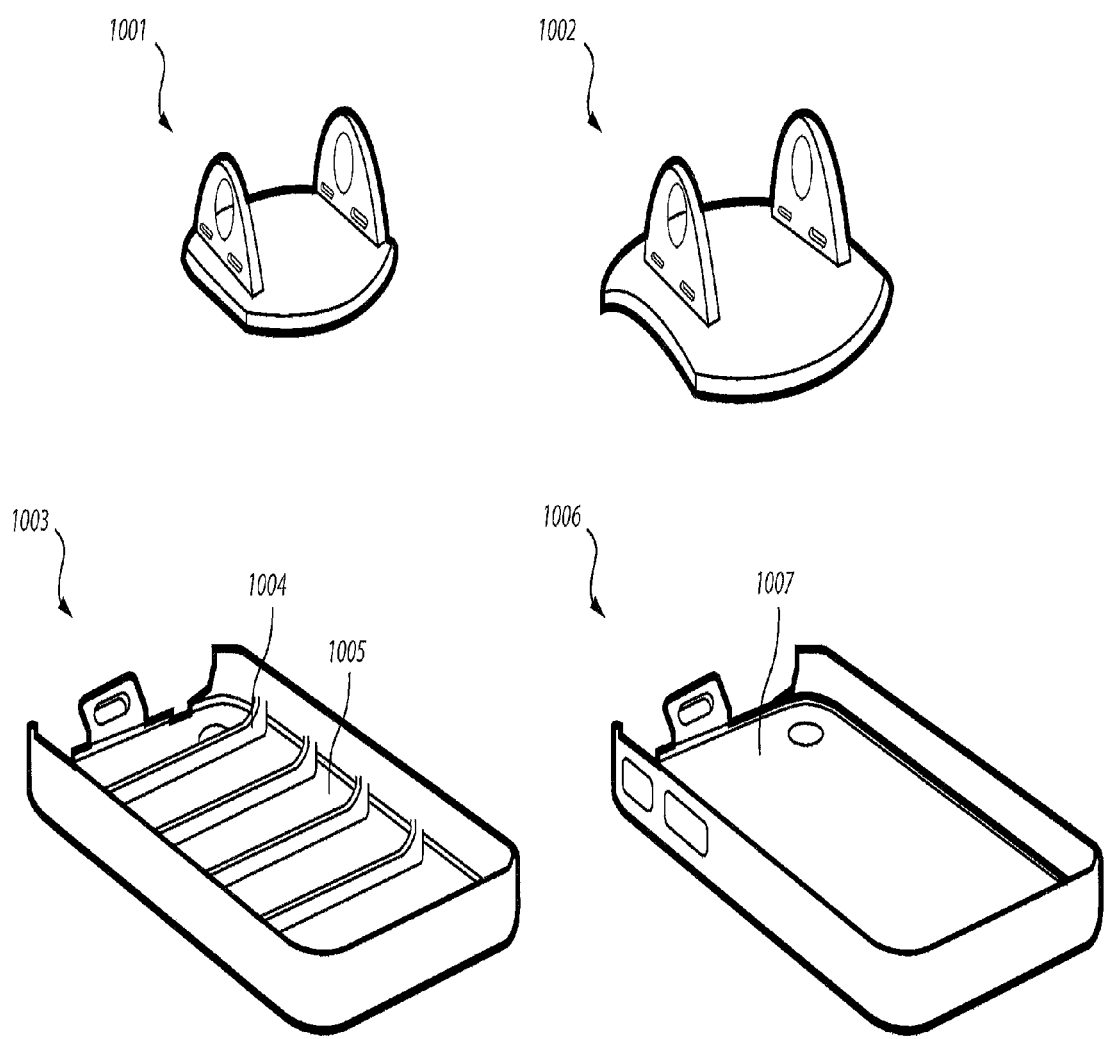
FIG. 10 illustrates a perspective view of various mounting assemblies and sled components in accordance with a system and method of the present invention.

Continuing on through the figures, FIG. 10 illustrates a perspective view of various mounting assemblies and sled components in accordance with a system and method of the present invention. As shown, FIG. 10 illustrates a flat mounting base 1001, curved mounting base 1002, ridged sled 1003, and flat sled 1006.

Flat mounting base 1001 and curved mounting base 1002 may be selected by a user according to the type of surface the POV video mounting system will be mounted to. For example, if a POV video mounting system of the present invention will be mounted to a flat surface such as on a surfing board, one may benefit from selecting a flat mounting base 1001 the mounting system. Alternatively, if a POV video mounting system of the present invention will be mounted to a helmet, one may select a curved mounting base 1002. As such, one may choose either flat mounting base 1001 or curved mounting base 1002 according to the type of surface to which a POV video mounting system will be permanently or semi-permanently affixed thereto.

FIG. 10 further includes illustrates a ridged sled 1003 and flat sled 1006 which are used according to the type of electronic device that will be contained within the casing assembly. As shown, ridged sled 1003 includes a plurality of ridges 1004 disposed on the base 1005 of the sled 1003 whereas flat sled 1006 features a flat base 1007. If the electronic device to be contained within the casing assembly is an iPhone smartphone device, one may benefit from using flat base 1006. Alternatively, if the electronic device is an iPod music player device, one may benefit from using the ridged sled 1003.

Figure 11:
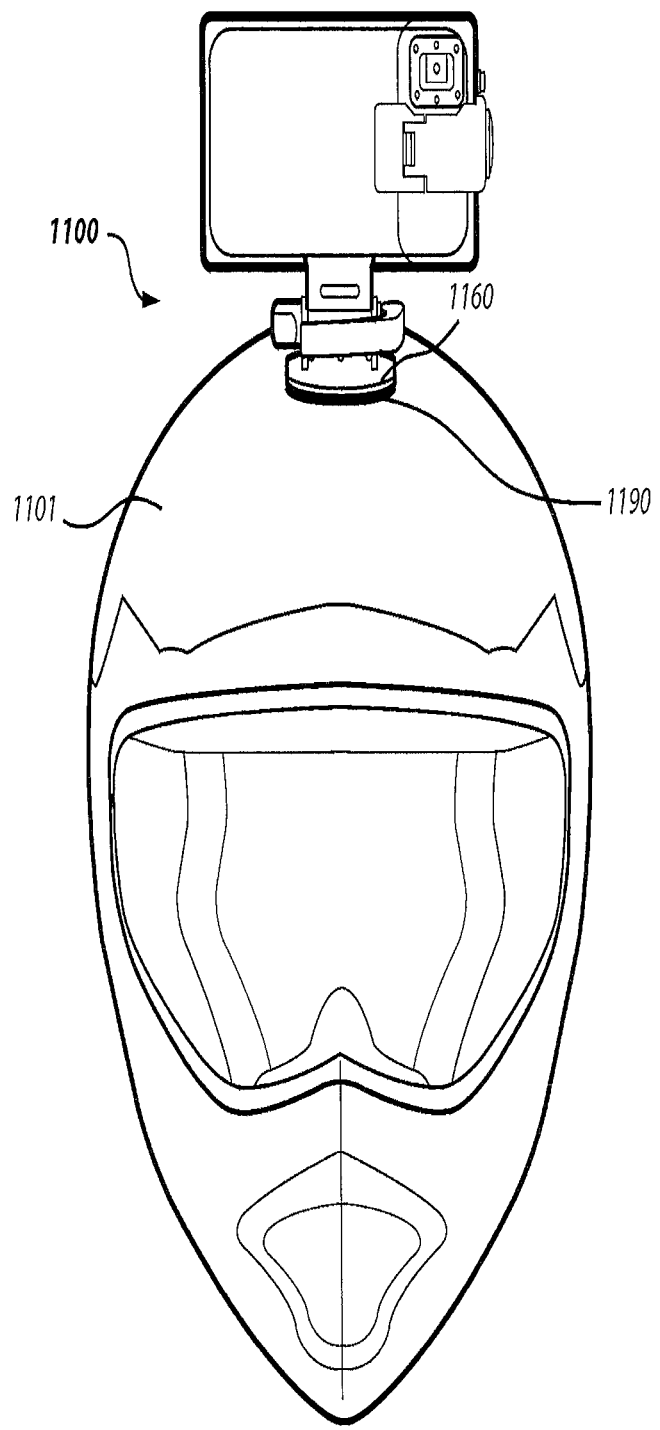
FIG. 11 illustrates a perspective view of a POV video mounting system coupled to a helmet in accordance with a system and method of the present invention.

Continuing on through the figures, FIG. 11 illustrates a perspective view of a POV video mounting system 1100 coupled to a helmet 1101 in accordance with a system and method of the present invention. As shown, POV video mounting system 1100 is affixed near the top of helmet 1101. In particular, the mounting assembly 1160 component of the mounting system 1100 is mounted to the helmet 1101 via an adhesive such as a foam tap pad 1190.

In the figure, the POV video mounting system is oriented such that the back of the casing sleeve faces the direction viewed by the user donning the helmet 1101. Accordingly, the POV video mounting system 1100 shown in the figure will record an area in the direction of what the user donning the helmet 1101 views. Otherwise, the POV video mounting system 1100 will record the back view of the user if the user so desires.

FIG. 12A illustrates a perspective view of a Point of View (POV) video mounting system 1200 mounted to a motorcycle 1201 in accordance with a system and method of the present invention. As shown, a user-driver can view the live images of his or her performance in real time.

Moving forward, FIG. 12B illustrates a close up view of the POV video mounting system 1200 mounted to motorcycle 1201 displayed in FIG. 12A. In particular, the figure shows a close up view of the POV video mounting system 1200 mounted to a gear shaft area of the motorcycle. As shown, the display of an electronic device within the casing assembly displays the recorded video footage of the user-driver's performance.

Additionally, performance data and other useful information are displayed by the electronic device. For example, the display of the electronic device may display a measurement of speed, acceleration, deceleration, and g-forces. In addition, as shown in the figure, the electronic device can show an indicator 1295 of the user-driver's trek along a course. It should be understood that performance data and other useful information can be generated and displayed by computer software application(s) ("computer apps") installed upon the electronic device.

Figure 13:
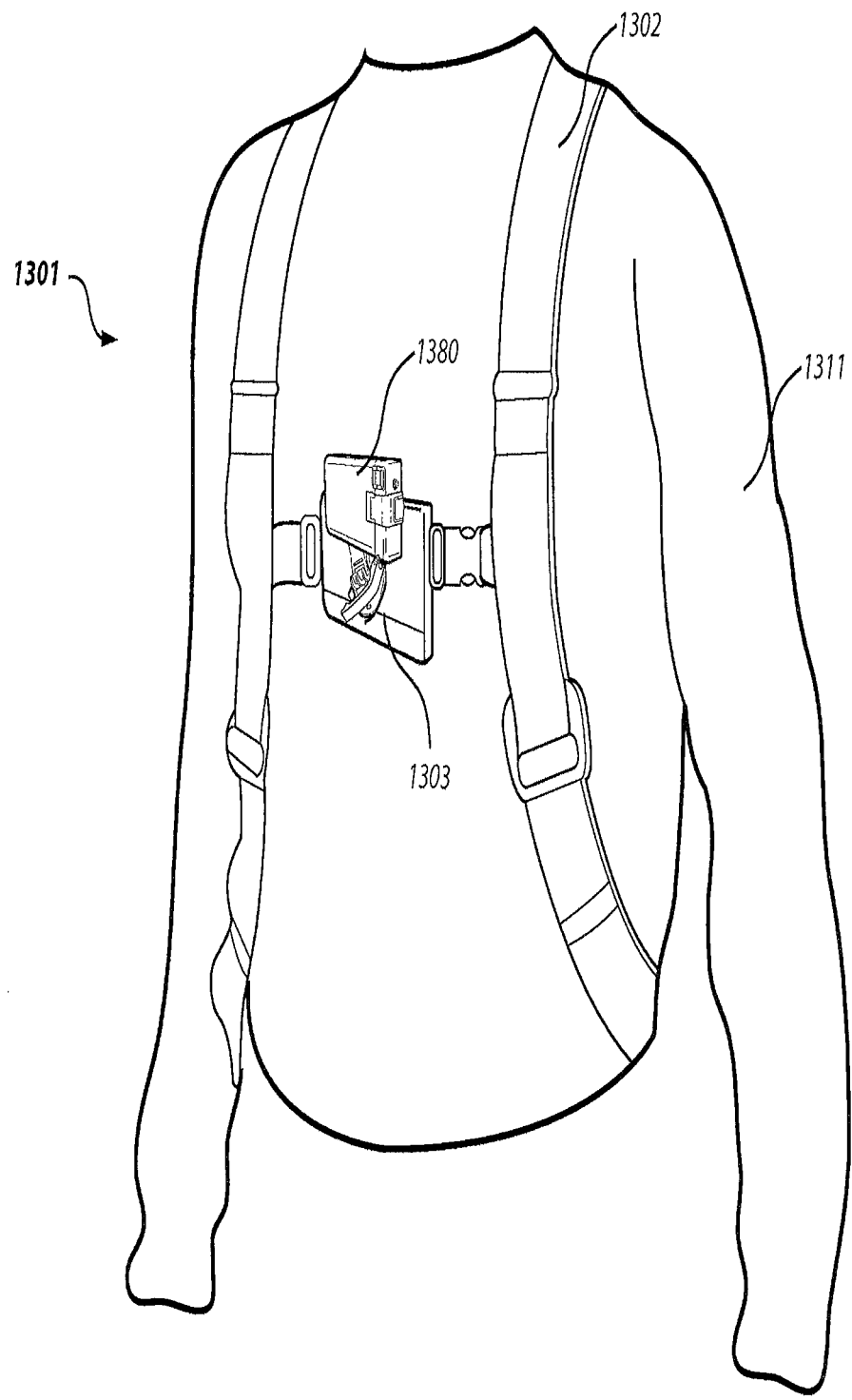
FIG. 13 illustrates a perspective view of a POV video mounting system coupled to a chest mount in accordance with a system and method of the present invention.

FIG. 13 illustrates a perspective view of a POV video mounting system 1380 coupled to a chest mount 1301 in accordance with a system and method of the present invention. As shown, chest mount 1301 includes chest straps 1302 which are to be suspended from a user's torso 1311. Chest mount 1301 further includes a mounting base 1303 of which a POV mounting system 1380 is mounted thereto. In operation, chest mount 1301 can support a POV mounting system 1380 coupled thereto to record and display a user's real time performance, performance metrics, and other useful information.

Figure 14:
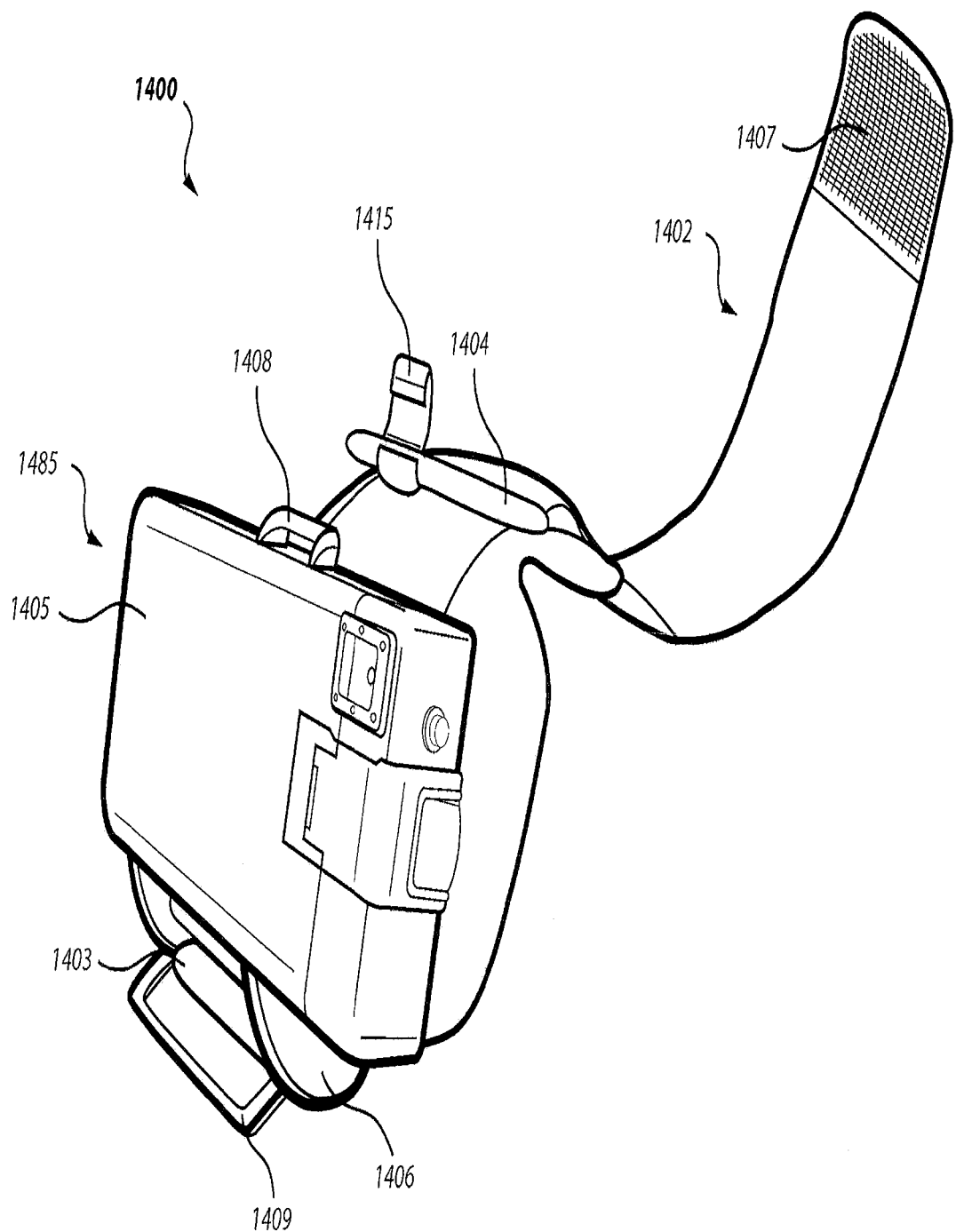
FIG. 14 illustrates a perspective view of a POV video mounting system coupled to a wrist mount in accordance with a system and method of the present invention.

In addition, FIG. 14 illustrates a perspective view of a POV video mounting system 1485 coupled to a wrist mount 1400 in accordance with a system and method of the present invention. As shown, wrist mount 1400 includes a casing assembly (e.g. casing sleeve 1405) coupled to a base 1403 component of the wrist mount 1400.

Furthermore, wrist mount 1400 includes a snap component 1415 suspended from a bracket component 1404 of a strap 1402 which connects to a snap component 1408 of the casing assembly 1405. Once, the casing sleeve 1405 is latched, a user can don the wrist mount 1400 by wrapping the strap 1402 around the user's arm, then weaving the strap 1402 through buckle 1409, and finally connecting the front side of the strap 1402 against the back side of strap 1402 via velco 1407 disposed on the strap 1402.

Accordingly, a wrist mount 1400 with a POV video mounting system 1405 coupled thereto provides a way for users to record their performance in real time while participating in sporting activities. Additionally, users can select which images get recorded by moving the POV device 1485 to capture any desired images.

A POV video mounting system has been described. It will be understood by those having ordinary skill in the art that the present invention may be embodied in other specific forms without departing from the spirit and scope of the invention disclosed. In addition, the examples and embodiments described herein are in all respects illustrative and not restrictive. Those skilled in the art of the present invention will recognize that other embodiments using the concepts described herein are also possible.

What is claimed is:

1. A case for an electronic communications device, the electronic communications device having a lens for capturing images, the case comprising: an external casing assembly comprising:

a) an external sleeve defining an interior space, the sleeve comprising opposing major front and back walls, opposing side walls connecting the front and back walls, and an opening defined by the front, back and side walls at one longitudinal end thereof;

b) a door movably mounted at the longitudinal end of the external sleeve for movement between an open position opening the opening of the external sleeve and a closed position closing the opening;

c) a releasable latch for securing the door in the closed position; and d) an interchangeable lens assembly comprising a lens and a lens holder, the lens holder being removably attached to a front side of the casing assembly, the removable attachment permitting removal of the lens assembly from the casing assembly;

a sled component for receiving the electronic communication device thereon, the sled component being configured for removable receipt in an inserted position in the interior space of the external sleeve by longitudinal insertion into the opening thereof with the electronic communications device received thereon, the sled component being configured to reduce vibrations experienced by the electronic communications device;

the sled component having a lens exposing area positioned for alignment with the lens of the electronics communications device, the sled component being further configured such that in the installed position thereof the lens of the electronic communications device and the lens exposing area of the sled component are aligned with the lens of the interchangeable lens assembly to permit the electronic communications device to capture images therethrough.

2. The case of claim 1, wherein the sled comprises a material for reducing the vibrations experienced by the electronic communications device.

3. The case of claim 1, wherein the sled component and external sleeve are configured such that the sled component slides in the external sleeve during the longitudinal insertion.

4. The case of claim 2, wherein the sled component and external sleeve are configured such that the sled component slides in the external sleeve during the longitudinal insertion.

5. The case of claim 2, wherein the material of the sled component is plastic or rubber.

6. The case of claim 1, wherein the lens exposing area of the sled component is an opening.

7. The case of claim 6, wherein the opening of the lens exposing area of the sled component is a cut-out.

8. The case of claim 1, wherein the interchangeable lens assembly is provided on the door of the external casing assembly with the lens holder being removably attached to a front side of the door, and wherein the door in the closed position aligns the lens of the interchangeable lens assembly with the lens of the electronic communications device and the lens exposing area of the sled component in the installed position thereof.

9. The case of claim 8, wherein the back wall of the external sleeve has a greater longitudinal length than the front wall, and the sled component is configured in its installed position to be extend longitudinally through the opening of the external sleeve.

10. The case of claim 1, wherein the door is pivotally mounted to the external sleeve.

11. The case of claim 10, wherein the door is pivotally mounted to the back wall of the external sleeve.

12. The case of claim 1, wherein the door includes a button positioned to be aligned with and moveable to operate a button on the electronic communications device when received on the sled component in the installed position thereof.

13. The case of claim 10, wherein the button on the door is on an end wall of the door.

14. The case of claim 8, wherein the door includes a button positioned to be aligned with and moveable to operate a button on the electronic communications device when received on the sled component in the installed position thereof.

15. The case of claim 14, wherein the button on the door is on an end wall of the door.

16. The case of claim 1, wherein the rear wall of the external sleeve includes a transparent area through which a touchscreen display of the electronic communications device is operable.

17. The case of claim 2, wherein the rear wall of the external sleeve includes a transparent area through which a touchscreen display of the electronic communications device is operable.

18. The case of claim 8, wherein the rear wall of the external sleeve includes a transparent area through which a touchscreen display of the electronic communications device is operable.

19. The case of claim 12, wherein the rear wall of the external sleeve includes a transparent area through which a touchscreen display of the electronic communications device is operable.

20. The case of claim 14, wherein the rear wall of the external sleeve includes a transparent area through which a touchscreen display of the electronic communications device is operable.

21. The case of claim 1, wherein the sleeve further comprises an end wall connecting the front, back and side walls at an opposite longitudinal end of the sleeve.

* * * * *